United States Patent
Yi et al.

(10) Patent No.: US 9,811,229 B2
(45) Date of Patent: Nov. 7, 2017

(54) CAPACITIVE TOUCH SENSING

(71) Applicant: TEXAS INSTRUMENTS INCORPORATED, Dallas, TX (US)

(72) Inventors: Zhou Yi, Shanghai (CN); Zhang Jun, Shanghai (CN); Shen Ge, Shanghai (CN); Xu Kang Cheng, Shanghai (CN); Hao Meng, Shanghai (CN); Ji Ru Jun, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/449,224

(22) Filed: Mar. 3, 2017

(65) Prior Publication Data

US 2017/0177119 A1 Jun. 22, 2017

Related U.S. Application Data (63) Continuation of application No. 14/659,091, filed on Mar. 16, 2015, now abandoned, which is a continuation of application No. PCT/CN2014/091126, filed on Nov. 14, 2014.

(51) Int. Cl.
*G01R 27/26* (2006.01)
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ............................... G06F 3/044; G06F 3/0416
USPC .......................................... 324/678; 345/174
See application file for complete search history.

(56) References Cited

U.S. PATENT DOCUMENTS

| | | | |
|---|---|---|---|
| 8,952,922 B2* | 2/2015 | Lin ......................... | G06F 3/044 324/658 |
| 2011/0216033 A1* | 9/2011 | Mamba ................. | G06F 3/0418 345/174 |
| 2012/0075244 A1* | 3/2012 | Zhang ..................... | G06F 3/044 345/174 |
| 2012/0113038 A1* | 5/2012 | Chen ..................... | G06F 3/0412 345/173 |

(Continued)

FOREIGN PATENT DOCUMENTS

| | | |
|---|---|---|
| AU | 2004241970 | 12/2005 |
| SU | 839055 | 6/1981 |

OTHER PUBLICATIONS

International Search Report in corresponding PCT Application No. PCT/CN2014/091126, dated Jul. 30, 2015 (3 ages).

*Primary Examiner* — Billy Lactaoen
(74) *Attorney, Agent, or Firm* — John R. Pessetto; Charles A. Brill; Frank D. Cimino (57) ABSTRACT

A touch sensor apparatus includes a grid of intersecting sensor lines, a plurality of input/output (IO) pins, a plurality of diodes, a processor coupled to the IO pins. More specifically, each intersection includes a capacitor coupling together the intersecting sensor lines. Each diode is coupled to a corresponding IO pin, wherein each IO pin couples through its corresponding diode to a channel of intersection points of the sensor lines and, without the diode, each IO pin couples to a different channel of intersecting points of the sensor lines. The processor is configured to sequentially provide a transmit signal through each IO pin while detecting a response signal on the other IO pins.

15 Claims, 4 Drawing Sheets

(56) References Cited

U.S. PATENT DOCUMENTS

| 2013/0215075 A1* | 8/2013 | Lee | G06F 3/044 |
| | | | 345/174 |
| 2015/0242028 A1* | 8/2015 | Roberts | G06F 3/0416 |
| | | | 345/173 |
| 2016/0139704 A1* | 5/2016 | Yi | G06F 3/0416 |
| | | | 345/174 |

* cited by examiner

CAPACITIVE TOUCH SENSING

CROSS-REFERENCE TO RELATED APPLICATIONS

This continuation application claims priority to U.S. patent application Ser. No. 14/659,091, filed Mar. 16, 2015, which application is a continuation of International Application No. PCT/CN2014/091126, with an international filing date of Nov. 14, 2014, which designated the United States, all the above applications of which are hereby fully incorporated herein by reference for all purposes.

BACKGROUND

Touch sensors are widely used in numerous types of electronic devices. One type of touch sensor is the capacitive touch sensor. Capacitive touch sensors are used in a variety of ways including cursor movement controls for computing devices such as tack pads, as well as proximity sensors, measuring positions or displacement, and humidity sensors. Many of the devices that use capacitive touch sensing are mobile devices that have a limited amount of space for hardware.

SUMMARY

Systems and methods to use less input/output (IO) pins to couple a touch sensor are disclosed herein. In an embodiment, a touch sensor apparatus includes a grid of intersecting sensor lines, a plurality of input/output (IO) pins, a plurality of diodes, a processor coupled to the IO pins. More specifically, each intersection includes a capacitor coupling together the intersecting sensor lines. Each diode is coupled to a corresponding IO pin, wherein each IO pin couples through its corresponding diode to a channel of intersection points of the sensor lines and, without the diode, each IO pin couples to a different channel of intersecting points of the sensor lines. The processor is configured to sequentially provide a transmit signal through each IO pin while detecting a response signal on the other IO pins.

In another embodiment, a capacitive touch sensing (CTS) controller includes a plurality of input/output (IO) pins, wherein each IO pin is to couple to first and second sensor lines of a touch sensor. The first and second sensor lines are usable to transmit a first signal and receive a second signal, wherein for each IO pin, the first sensor line is configured to interact with the second sensor lines from the other IO pins. The CTS controller further includes, for each IO pin, a diode that is configured to couple to one of the first or second sensor lines. Still further, the CTS controller includes a processor coupled to the IO pins. For each IO pin, the processor is configured to provide the first signal to be transmitted on the first sensor line and, based on each received second signal from another IO pin's second sensor line to calculate a capacitance value Yet in another embodiment, a method of detecting a touch point of a touch sensor comprising a grid of sensor lines, some sensor lines usable as transmit sensor lines and the remaining sensor lines usable as receive sensor lines, comprises sequentially transmitting a first pulse signal via an input/output (IO) pin coupled to each transmit sensor line, upon transmitting each first pulse signal via a given IO pin, detecting a sense signal on the receive sensor lines coupled to the remaining IO pins, and analyzing each sense signal to determine a capacitance value between the transmit sensor line corresponding to the given IO pin and the receive sensor lines of the remaining IO pins.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Mobile electronic devices have limited space and, accordingly, it is desirable for components that comprise the device to occupy as little space as possible. One such component is the capacitive touch sensor. Capacitive touch sensor apparatuses generally require at least two input/output (IO) pins for each pin button used in a touch sensor. More specifically, one IO pin couples to a transmit sensor line, and another IO pin couples to a receive sensor line of the touch sensor. As the number of pin buttons increases for larger and higher resolution touch sensors, the number of IO pins increases as well. Generally, a button is associated with an intersection of a transmit sensor line and a corresponding receive sensor line. The intersection of a transmit sensor line and a receive sensor line defines a capacitor, and thus each pin button is associated with one capacitor. Based on determining a capacitive value of the capacitor, the button of a touch sensor is operable to determine where the touch sensor has received an input (e.g., a contact). In an example, a touch sensor implementing a complex touch sensing mechanism (e.g., multiple touch points) or requiring more precise touch sensitivity may increase the number of buttons for the touch sensor, which in turn increase the number of IO pins.

Each IO pin is configured to be connected, not just to the transmit or receive sensor lines, but also to an external circuit such as a controller which determines which points on the sensor have been contacted by an object (e.g., finger, stylus). In general, each IO pin occupies a physical space on a touch sensor apparatus. As noted above, space may be a premium. In accordance with various embodiments, examples of a touch sensor are disclosure herein that reduces the number of IO pins needed to operate the sensor as to what would be needed for conventional touch sensors.

The disclosed capacitive touch sensor includes fewer IO pins than a conventional touch sensor of having an equivalent number of buttons. The disclosed embodiments to control the capacitive touch sensor may be limited in a mobile electronic device, as well as other types of devices that include a capacitive touch sensor.

The capacitive touch sensing utilizes capacitive variations generated by touch between an object (e.g., the human body) and the touch sensor to determine a touch event and the location of the touch point on the sensor. In a preferred example, the touch sensor being controlled by the disclosed CTS controller may be a projective capacitive touch sensor. A projective capacitive touch sensor incorporates a deformable, insulating elastomer or fluid between a top substrate and a bottom substrate, one or both of which are coated with transparent conductor (e.g., indium tin oxide (ITO)) electrode films. When contact is made with the top substrate by a touch event, the top substrate bends, at least partially, in the region where the contact is made. More particularly, the contact causes a change in the distance between the transparent electrode films, and in turn, a change in a capacitive value at the point of contact. Thus, a location of the contact, or touch, may be determined by sensing the change in the capacitive value.

The touch sensor generally includes an X-Y grid to form the top and bottom electrode films. More specifically, two separate, perpendicular electrode films with parallel lines or sensor lines to form the X-Y gird. A capacitor is formed by the intersecting sensor lines at each button of the touch sensor, and the button is preferably at each intersection of each row and each column of the X-Y grid. For example, a touch sensor with a 10-by-10 array may include 10 sensor lines aligned parallel in a first direction, and 10 sensor lines aligned parallel in a second direction that is perpendicular to the first direction. Thus, a 10-by-10 array includes 100 capacitors (i.e., buttons). Viewing the X-Y grid from a top perspective, the sensor lines in the first direction may intersect with the sensor lines in the second direction. However, the intersected sensor lines do not touch each other and short out.

Figure 1:
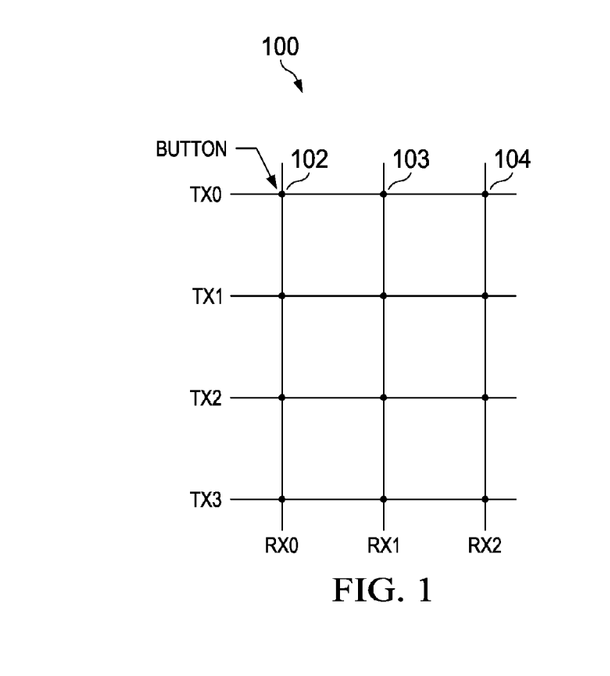
FIG. 1 shows an example of a touch sensor including a plurality of buttons deployed as an X-Y grid in accordance with various embodiments.

FIG. 1 shows a touch sensor 100 that is controlled by a conventional CTS controller. As described above, the touch sensor is implemented as an X-Y grid. In FIG. 1, the X-Y grid includes a 4-by-3 array. More specifically, the X-Y grid constitutes a first set of four transmit sensor lines (e.g., TX0, TX1, TX2, and TX3) and a second set of three receive sensor lines (e.g., RX0, RX1, and RX2). Generally, the sensor lines within each set are aligned in parallel. As shown in FIG. 1, the first set comprising TX0-TX3 extends in a first direction while the second set comprising RX0-RX2 extends in a second direction that is perpendicular to the first direction. As such, each sensor line in the first set intersects with three sensor lines of the second set at three intersections, and thus three buttons. For example, transmit sensor line TX0 intersects with each of the three receive sensor lines thereby defining three buttons 102, 103 and 104. As explained above, the intersection is referred to as a button, which corresponds to a capacitor between the intersecting sensor lines. For example, the button 102 corresponds to a capacitor that couples the sensor line TX0 and the sensor line RX0.

Referring still to FIG. 1, the first set of sensor lines (TX0-TX3) is configured to be operable in a transmitting mode, and the second set of sensor lines (RX0-RX2) is configured to be operable in a receiving mode. In other words, the sensor lines in the transmitting first set are only available to transmit a signal, and the sensor lines in the receiving second set are only available to receive a signal. To operate the touch sensor 100, the conventional CTS controller is generally coupled to the touch sensor 100 via coupling each IO pin of the CTS controller (not shown in FIG. 1) to each of the sensor lines of the touch sensor 100. For example, an IO pin coupled to the sensor line TX0 may be usable only to transmit a signal through the sensor line TX0. In order to determine whether a button of the touch sensor 100 receives an input (i.e., touched), the conventional CTS controller would require to include at least 7 IO pins to operate the 4-by-3 sensor array of FIG. 1. Since each IO pin of the conventional CTS controller can be coupled to only one sensor line, the controller itself must have 7 IO pins—one corresponding to each sensor line.

In comparison, the disclosed embodiments provide a CTS controller that includes fewer IO pins to detect a touch point on a touch sensor with the same number of buttons. Thus, for the 12-button touch sensor example of FIG. 1, the disclosed CTS controller would need fewer than 7 IO pins. Alternatively stated, for a given number of controller IO pins, the disclosed CTS controller would be able to operate a touch sensor with more buttons than would be possible with a conventional CTS controller. Generally, more buttons for a given size touch sensor creates higher touch resolution, which may be desirable for various touch sensor applications. Moreover, the disclosed CTS controller can operate touch sensors with fewer IO pins than would otherwise be the case for conventional CTS controllers.

In general, the touch sensor arrays of the disclosed examples include buttons that are coupled to sensor lines in a different manner than is the case for conventional sensor arrays. The different wiring methodology permits the CTS controller to use the same IO pin for multiple purposes—transmitting and receiving. That the same IO pin can be multi-purposed permits the controller to use fewer IO pins. The touch sensor itself includes fewer IO pins than conventional touch sensors.

Figure 2:
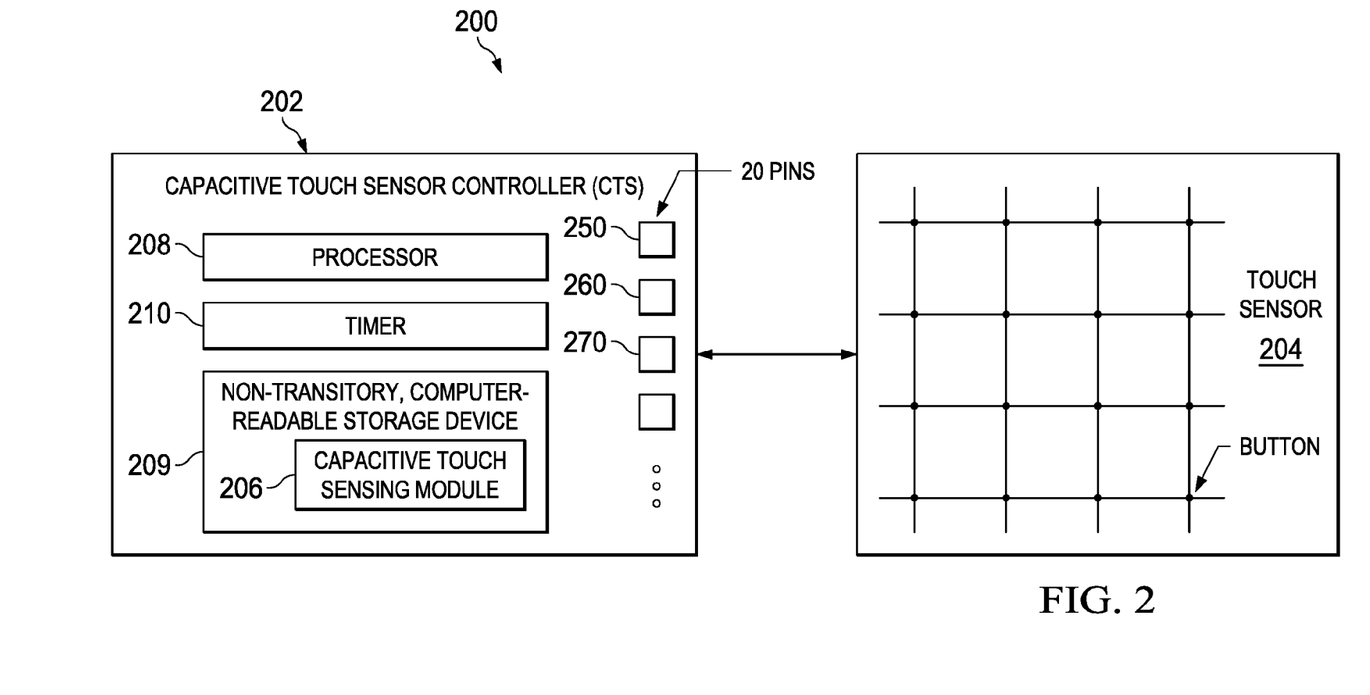
FIG. 2 shows a block diagram of a capacitive touch sensor controller coupled to a touch sensor in accordance with various embodiments.

FIG. 2 shows a block diagram 200 to illustrate the disclosed CTS controller 202 in accordance with various embodiments. In FIG. 2, the CTS controller 202 is coupled to a touch sensor 204 via multiple IO pins (e.g., IO pins 250, 260, and 270). In a preferred embodiment, by connecting a diode to each IO pin (illustrated and explained with respect to FIG. 3), the disclosed CTS controller 202 couples to the touch sensor 204 via fewer IO pins than for a conventional CTS controller. The connections between buttons and the sensor's and controller's IO pins are further illustrated below. Each button of the touch sensor 204 may be coupled to at least one of the IO pins of the CTS controller 202.

Although the CTS controller 202 and the touch sensor 204 are shown as two individual devices, in some embodiments, the CTS controller 202 and the touch sensor 204 may be combined as a unitary device. The CTS controller 202 may include a processor 208, a non-transitory, computer-readable storage device 209, and a timer 210.

Further, the non-transitory, computer-readable storage device 209 may be implemented as volatile storage (e.g., random access memory), non-volatile storage (e.g., hard disk drive, optical storage, solid-state storage, etc.) or combinations of various types of volatile and/or non-volatile storage. The storage device 209 further comprises an executable capacitive touch sensing module 206. As a result of executing the capacitive touch sensing module 206 by the processor 208, the CTS controller 202 may provide several functionalities, such as determining which of the buttons of the coupled touch sensor 204 has been touched, analyzing whether a calculated capacitive value of a capacitor at a particular button of the touch sensor 204 violates various fault values, etc. Details of the capacitive touch sensing module 206 will be described with respect to FIG. 5.

In accordance with various embodiments, the disclosed CTS controller 202 includes multiple IO pins. Each IO pin couples to two sensor lines of the touch sensor 204. One of the two sensor lines is used to transmit a signal which is generally referred to as a "TX" sensor line. The other of the two sensor lines is to receive a signal, and is referred to as an "RX" sensor line. In other words, each IO pin may include two channels: one for transmitting and the other for receiving. One of the channels may include a diode configured to implement a direction of signal flow to ensure a transmitted signal along the TX sensor line does not propagate through the RX signal line, and that a received signal from the RX signal line does not propagate through the TX signal line. Details of the coupling between the CTS controller 202 and the touch sensor 204 will be explained with respect to FIGS. 3 and 4. The CTS controller 202 may be provided as a circuit on a printed circuit board (PCB).

Figure 3:
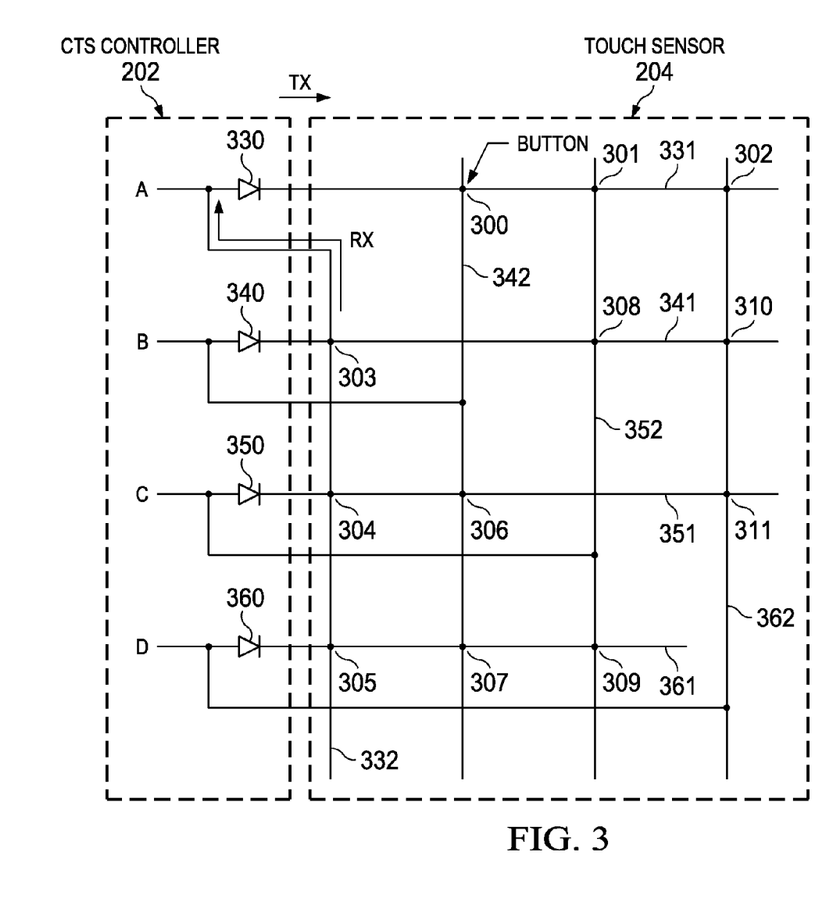
FIG. 3 shows an example of a coupling between input/output (IO) pins and buttons of a touch sensor in accordance with various embodiments.

FIG. 3 shows an example to illustrate the coupling between the IO pins of the CTS controller 202 and the touch sensor 204 in accordance with various embodiments. As shown in the example of FIG. 3, the CTS controller 202 comprises four IO pins, A, B, C, and D. Each IO pin is configured to couple to two sensor lines of the touch sensor 204. IO pin A couples to the sensor lines 331 and 332. IO pin B couples to the sensor lines 341 and 342. IO pin C couples to the sensor lines 351 and 352. IO pin D couples to the sensor lines 361 and 362.

Further, a diode is included for each IO pin as shown to ensure signal traveling along one sensor line does not propagate through the other sensor line. Diode 330 is provided for IO pin A, while diodes 340, 350, and 360 are provided for each of IO pins B, C, and D, respectively.

The touch sensor 204 in the example of FIG. 3 includes 12 buttons labeled as buttons 300-311. Each button is an intersection of two sensor lines of the touch sensor 204. Button 300 is the intersection of the sensor lines 331 and 342. Button 301 is the intersection of sensor lines 331 and 352. Button 302 is the intersection of sensor lines 331 and 362. Button 303 is the intersection of sensor lines 341 and 332. Button 304 is the intersection of sensor lines 351 and 332. Button 305 is the intersection of sensor lines 361 and 332. Button 306 is the intersection of sensor lines 351 and 342. Button 307 is the intersection of sensor lines 361 and 342. Button 308 is the intersection of sensor lines 341 and 352. Button 309 is the intersection of sensor lines 361 and 352. Button 310 is the intersection of sensor lines 341 and 362. Button 311 is the intersection of sensor lines 351 and 362.

Referring still to FIG. 3, for each IO pin, the sensor line that is coupled with a diode is configured to transmit a signal, and the sensor line that is coupled without a diode is configured to receive a signal. Preferably, the sensor line coupled to an IO pin that is configured to transmit a signal is referred to as "TX", and the sensor line coupled to an IO pin that is configured to receive a signal is referred to as "RX". For example, since the sensor lines 331 and 332 are coupled to the IO pin A, the sensor line 331 is referred to as TXA, and the sensor line 332 is referred to as RXA. Moreover, the sensor line 331 coupled to the IO pin A is configured to transmit a pulse signal to the intersected buttons 300, 301 and 302; the sensor line 332 coupled to the IO pin A is configured to receive a pulse signal respectively from the intersected buttons 303, 304, and 305. As mentioned above, each button is an intersection of two sensor lines. More specifically, one of the two intersected sensor lines is a sensor line that is a TX of first IO pin, and the other intersected sensor line is a sensor line that is a RX of a second IO pin. For example, the button 303 is the intersection of the sensor lines 341 (TXB) and 332 (RXA). The button 304 is the intersection of the sensor lines 351 (TXC) and 332 (RXA). The button 305 is the intersection of the sensor lines 361 (TXD) and 332 (RXA).

Figure 4:
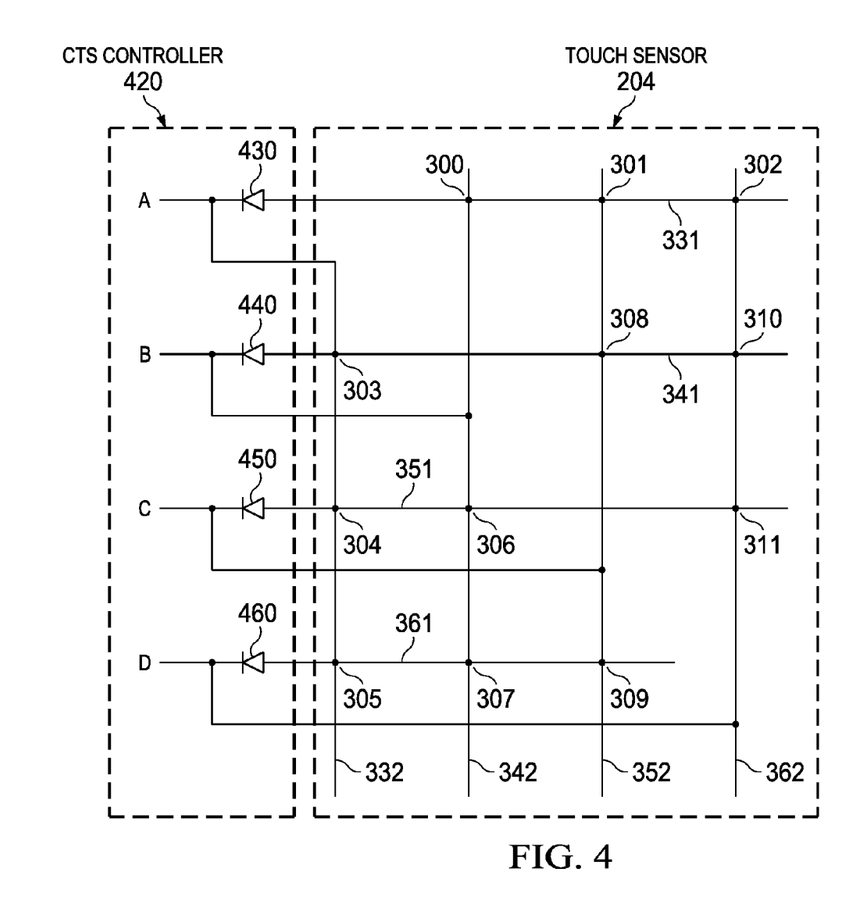
FIG. 4 shows another example of a coupling between input/output (IO) pins and buttons of a touch sensor in accordance with various embodiments.

FIG. 4 shows another example to illustrate the coupling between the IO pins of the CTS controller 420 and the touch sensor 204 in accordance with various embodiments. The CTS controller 420 in FIG. 4 is similar to that of FIG. 3, but the direction of the diodes has been reversed. Similarly with the example in FIG. 3, the CTS controller 202 also comprises four IO pins, A, B, C, and D. Each IO pin couples to two sensor lines of the touch sensor 204. More specifically, IO pin A couples to the sensor lines 331 and 332. IO pin B couples to the sensor lines 341 and 342. IO pin C couples to the sensor lines 351 and 352. IO pin D couples to the sensor lines 361 and 362. Further, for each IO pin, one of the coupled sensor lines couples to a diode. For example, the sensor line 331 couples to diode 430. The sensor line 441 couples to diode 440. The sensor line 351 couples to diode 450. The sensor line 361 couples to diode 460. The touch sensor 204 includes 12 buttons, 300~311. Each button is an intersection of two sensor lines of the touch sensor 204. For example, button 300 is the intersection of the sensor lines 331 and 342. Button 301 is the intersection of sensor lines 331 and 352. Button 302 is the intersection of sensor lines 331 and 362. Button 303 is the intersection of sensor lines 341 and 332. Button 304 is the intersection of sensor lines 351 and 332. Button 305 is the intersection of sensor lines 361 and 332. Button 306 is the intersection of sensor lines 351 and 342. Button 307 is the intersection of sensor lines 361 and 342. Button 308 is the intersection of sensor lines 341 and 352. Button 309 is the intersection of sensor lines 361 and 352. Button 310 is the intersection of sensor lines 341 and 362. Button 311 is the intersection of sensor lines 351 and 362.

With the diodes 430, 440, 450, and 460 being reversed as compared to the diodes of FIG. 3, the signals propagate along the sensor lines in an opposite direction as well. Thus, what were the TX sensor lines in FIG. 3 are now the RX sensor lines, and what were the RX sensor lines are now the TX sensor lines. Thus, in FIG. 4, sensor lines 331, 341, 351, and 361 are RX sensor lines, while sensor lines 332, 342, 352, and 362 are TX sensor lines.

In summary, in accordance with a preferred embodiment, for the same number of buttons, the disclosed CTS controller 202 requires fewer IO pins compared to conventional CTS controllers. The examples of FIGS. 3 and 4 only require four IO pins to couple to 12 buttons, whereas a conventional CTS controller might require seven IO pins. Alternatively stated, for the same number of IO pins, the disclosed CTS controller can couple to more buttons of a touch sensor than would be possible for a conventional controller. If the disclosed CTS controller 202, 420 include "x" IO pins, the controller may couple up to x*(x−1) buttons.

Figure 5:
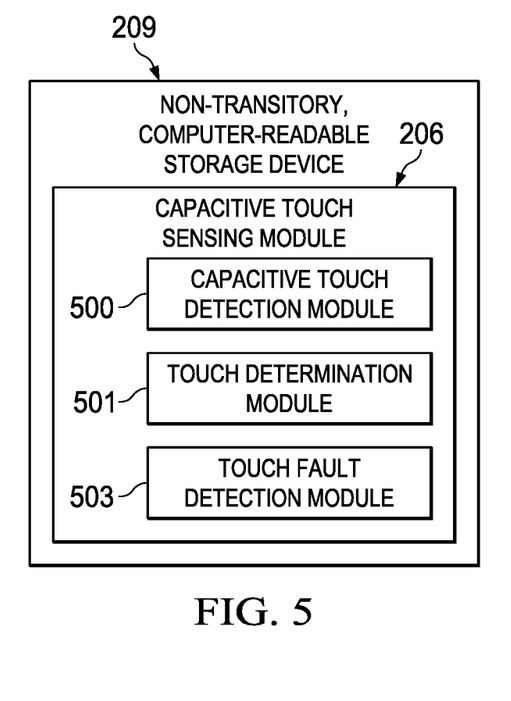
FIG. 5 shows an example of a capacitive touch sensing module in accordance with various embodiments.

FIG. 5 shows an example to further illustrate the capacitive touch sensing module 206 in accordance with various embodiments. The capacitive touch sensing module 206 further includes capacitive touch detection module 500, touch determination module 501, and touch fault detection module 503. As a result of the processor 208 executing each module 500-503 of the capacitive touch sensing module 206, the CTS controller 202 may provide a corresponding functionality which will be described below.

While the processor 208 executes the capacitive touch detection module 500, the CTS controller 202 is caused to detect a capacitance change (i.e., a change of a capacitive value of a capacitor or a button). The capacitive touch detection module 500 preferably is operable to convert the change in capacitance of touch sensor 204 into a change in frequency or a change in time. The capacitive touch detection module 500 is additionally operable to send information about the change in frequency or change in time to touch determination module 501.

As a result of executing the touch determination module 501, the CTS controller 202 is configured to determine whether the touch sensor 204 has actually been touched. In an example, touch determination module 501 is operable to actively scan each sensor lines of the touch sensor 204 in order to detect a user input via post processing of the information sent from capacitive touch detection module 500. More specifically, a pulse signal is transmitted via a given IO pin, and sense signals on all remaining sensor lines coupled to the remaining IO pins are received via the remaining IO pins. Continuing with the above example in which the pulse signal is transmitted via the sensor line 331 (IO pin A), the CTS controller 202 detects sense signals from the all remaining IO pins B, C, and D. Still more specifically, the sense signals are received via receive sensor lines 342, 352, and 362 which are coupled to the IO pins B, C, and D respectively. As explained above, the button 300 is the intersection of the sensor lines 331 and 342; the button 301 is the intersection of the sensor lines 331 and 352; the button 302 is the intersection of the sensor lines 331 and 362. As such, a change in the capacitive value at any one button (e.g., buttons 300, 301 and 302) may be detected by the CTS controller 202. Details of the transmitting and receiving via an IO pin will be described with respect to the flow chart in FIG. 6.

In FIG. 5, touch determination module 503 is additionally operable to determine the type of touch input by a user using a stored database of components. For example, by executing the touch determination module 501, the CTS controller 202 may determine whether the user input is a single point contact (i.e., touching a single button of the touch sensor 204), a slide touch, or a multi-point touch.

Referring still to FIG. 5, while the processor 208 executes the touch fault detection module 503, the CTS controller 202 is configured to determine whether there is a fault in the touch sensor 204. In a preferred embodiment, the touch fault detection module 503 is operable to determine whether the touch sensor 204 has a fault or a malfunction based on predetermined fault threshold. For example, if two intersected sensor lines form a short circuit, a zero capacitive value may result from the short circuit. The CTS controller 202 may determine a presence of a malfunction (e.g., a short circuit formed between sensor lines) of the touch sensor 204 according to the zero capacitive value.

Figure 6:
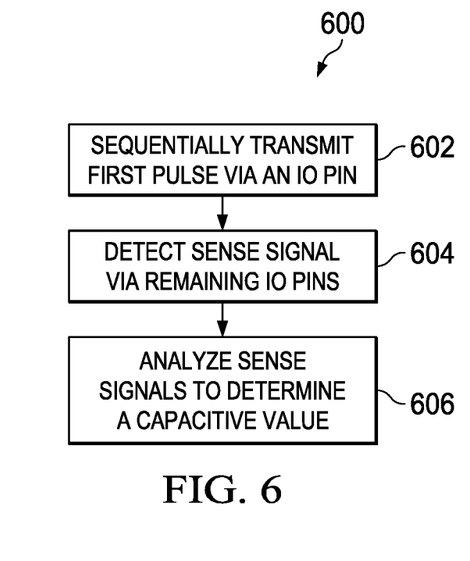
FIG. 6 shows a method to determine a capacitive value of a touch sensor in accordance with various embodiments.

FIG. 6 shows a flow chart 600 to determine a capacitive value by the CTS controller 202 in accordance with various embodiments. The flow chart 600 starts in block 602 with sequentially transmitting a pulse signal via a first IO pin coupled to each transmit sensor line. In a preferred embodiment, the sequential transmitting may result from executing the capacitive touch detection module 500 by the processor 208. For example, referring to FIG. 3, the processor 208 executing the capacitive touch detection module 500 results in the controller causing a pulse signal to be transmitted via IO pin A and through the sensor line 331.

After transmitting the pulse signal via a given IO pin, the flow chart 600 continues in block 604 with detecting a sense signal on all remaining sensor lines coupled to the remaining IO pins. Continuing with the above example in which the pulse signal is transmitted via the sensor line 331 (IO pin A), the CTS controller 202 detects sense signals from the all remaining IO pins B, C, and D. More specifically, the sense signals are received via receive sensor lines 342, 352, and 362 which are coupled to the IO pins B, C, and D respectively. As explained above, the button 300 is the intersection of the sensor lines 331 and 342; the button 301 is the intersection of the sensor lines 331 and 352; the button 302 is the intersection of the sensor lines 331 and 362. As such, a change in the capacitive value at any one button (e.g., buttons 300, 301 and 302) may be detected by the CTS controller 202.

After transmitting the pulse signal via the first IO pin (e.g., IO pin A) and receiving the sense signals from the remaining IO pins, the CTS controller 202 transmits another pulse signal via the next IO pin (e.g., IO pin B), and receives a sense signal from the remaining IO pins (IO pins A, C, and D). The sense signals via the sensor lines 332, 352, and 362 correspond to the capacitive values at the buttons 303, 308, and 310 respectively. The process depicted in blocks 602 and 604 repeats until the controller has caused pulse signals to be transmitted via all IO pins and has received sense signals on all other IO pins.

The flow chart 600 then continues in block 606 with analyzing the received sense signals so as to determine a capacitance value at each button to determine whether and where a touch point may be occurring. The analysis of block 606 may be performed after a given sensor line is scanned with a transmitted pulse signal, or after all sensor lines have been scanned.

The analysis of the received sense signals may result from the processor 208 executing the touch determination module 501. Continuing with the above example, once the processor 208 executes the touch determination module 501 after receiving the sense signals from the IO pins B, C, and D via the sensor lines 342, 352, and 362, the CTS controller 202 analyzes the sense signals associated with the buttons 300, 301 and 302. In one embodiment, the analysis of the sense signals may include measuring the amount of time to charge a capacitor at a button to a predefined voltage level. More specifically, once a button is touched, the corresponding capacitive value at the button may vary which in turn changes the amount of time to charge the capacitor at the button. The amount of time is preferably measured by the timer 210 of the CTS controller 202. Based on the change in the amount of time to charge the capacitor, the CTS controller 202 may determines which of the buttons of the touch sensor 204 has been touched and further determines the change of the capacitive value at the touched button. The determination of the change in the capacitive value may be useful in some further applications for the touch sensor 204. For example, if the change is not greater than a predefined threshold, the CTS controller 202 may determine that an invalid touch occurs, for example, the button not actually being touched.

In another embodiment, the analysis of the sense signals may include digitizing the sense signals. For example, the digitization may be performed by an analog-digital converter (ADC) included within or provided external to the controller 202.

Continuing with the example, after receiving the sense signals from the IO pins A, C, and D (following pulse transmission on IO pin B) via the sensor lines 332, 352, and 362, the CTS controller 202 analyzes the sense signals associated with the buttons 303, 308 and 310. Similarly, after receiving the sense signals from the IO pins A, B, and D (following pulse transmission on IO pin C) via the sensor lines 332, 342, and 362, the CTS controller 202 analyzes the sense signals associated with the buttons 304, 306 and 311. Finally, after receiving the sense signals from the IO pins A, B, and C (following pulse transmission on IO pin D) via the sensor lines 332, 342, and 352, the CTS controller 202 analyzes the sense signals associated with the buttons 305, 307 and 309.

Yet in another preferred embodiment, the CTS controller 202 may detect a presence of a malfunction of a capacitor at a button by executing the touch fault detection module 503 by the processor 208. The CTS controller 202 is configured to compare the capacitance value analyzed in block 606 with a fault threshold to determine whether a malfunction of a capacitor associated a button is present.

The above discussion is meant to be illustrative of the principles and various embodiments of invention touch sensor apparatus and related devices and methods. Numerous variations and modifications will become apparent to those skilled in the art once the above disclosure is fully appreciated. It is intended that the following claims be interpreted to embrace all such variations and modifications.

What is claimed is:

1. A touch sensor apparatus, comprising:
   a grid of intersecting sensor lines, each intersection including a capacitor coupling together the intersecting sensor lines;
   a plurality of input/output (IO) pins; and
   a plurality of diodes, each diode coupled to a corresponding IO pin, wherein each IO pin couples through its corresponding diode to a channel of intersection points of the sensor lines and, without the diode, each IO pin couples to a different channel of intersection points of the sensor lines; and
   a processor coupled to the IO pins and configured to sequentially provide a transmit signal through each IO pin while detecting a response signal on the other IO pins.

2. The touch sensor apparatus of claim 1, wherein the processor is configured to provide a transmit signal through each IO pin and to the channel of the IO pin without the diode, and to receive response signals from the remaining IO pins via channels with diodes.

3. The touch sensor apparatus of claim 1, wherein the processor is configured to provide a transmit signal through each IO pin and to the channel with the diode of that IO pin, and to receive response signals from the remaining IO pins via channels without diodes.

4. The touch sensor apparatus of claim 1, wherein each response signal includes an amount of time that the transmit signal takes to charge the capacitor coupling together the sensor line on which the transmit signal is provided and the sensor line through which the response signal is detected to a predefined voltage level.

5. The touch sensor apparatus of claim 4, further comprising a timer coupled to the processor to measure the amount of time.

6. The touch sensor apparatus of claim 1, wherein, based on the detected response signal, the processor is configured to calculate a capacitance value of the capacitor coupling together the intersecting sensor lines.

7. A capacitive touch sensing (CTS) controller, comprising:
   a plurality of input/output (IO) pins, each IO pin is to couple to first and second sensor lines of a touch sensor, said first and second sensor lines are usable to transmit a first signal and receive a second signal, wherein for each IO pin, the first sensor line is configured to interact with the second sensor lines from the other IO pins;
   for each IO pin, a diode is configured to couple to one of the first or second sensor lines; and
   a processor coupled to the IO pins, and wherein for each IO pin, the processor is configured to provide the first signal to be transmitted on the first sensor line and, based on each received second signal from another IO pin's second sensor line to calculate a capacitance value.

8. The CTS controller of claim 7, wherein the processor is configured to transmit the first signal via the first sensor line so as to alter a capacitance value of a capacitor coupled between the first sensor line and each of the corresponding second sensor lines.

9. The CTS controller of claim 7, wherein the first and second signals are pulse signals.

10. The CTS controller of claim 7, further comprising a timer coupled to the processor, the timer is configured to measure the amount of time to charge a capacitor between the first sensor line of an IO pin and one of the second sensor lines coupled to the other IO pins.

11. The CTS controller of claim 7, wherein the diodes and the processor are integrated on a printing circuit board (PCB).

12. A method of detecting a touch point of a touch sensor comprising a grid of sensor lines, some sensor lines usable as transmit sensor lines and the remaining sensor lines usable as receive sensor lines, comprising:
   sequentially transmitting a pulse signal via an input/output (IO) pin coupled to each transmit sensor line;
   upon transmitting each pulse signal via a given IO pin, detecting a sense signal on the receive sensor lines coupled to all remaining IO pins; and
   analyzing each sense signal to determine a capacitance value between the transmit sensor line corresponding to the given IO pin and the receive sensor lines of the remaining IO pins.

13. The method of claim 12, wherein analyzing each sense signal includes measuring the amount of time to charge a capacitor to a predefined voltage level, the capacitor coupled between the transmit sensor line of the given IO pin and an intersecting receive sensor line of another IO pin.

14. The method of claim 12, wherein analyzing each sense signal includes digitizing the sense signal.

15. The method of claim 12, further comprising comparing the determined capacitance value with a fault threshold to detect a presence of a malfunction on a capacitor coupled between a transmit sensor line and intersecting receive sensor line.

* * * * *